(12) United States Patent
Barnes-Davin et al.

(10) Patent No.: US 8,568,528 B2
(45) Date of Patent: Oct. 29, 2013

(54) IRON-DOPED SULFO-BELITIC CLINKER

(75) Inventors: Laury Barnes-Davin, Voiron (FR);
Pascal Meric, Bourgoin-Jallieu (FR);
Michel Pasquier, Lyons (FR); Guy Beauvent, Wierre Effroy (FR)

(73) Assignee: Vicat, Paris La Defense (FR)

( * ) Notice: Subject to any disclaimer, the term of this patent is extended or adjusted under 35 U.S.C. 154(b) by 0 days.

(21) Appl. No.: 13/810,768

(22) PCT Filed: Jul. 20, 2011

(86) PCT No.: PCT/FR2011/051744
§ 371 (c)(1),
(2), (4) Date: Jan. 30, 2013

(87) PCT Pub. No.: WO2012/010800
PCT Pub. Date: Jan. 26, 2012

(65) Prior Publication Data
US 2013/0118384 A1    May 16, 2013

(30) Foreign Application Priority Data
Jul. 21, 2010 (FR) ...................... 10 55926

(51) Int. Cl.
*C04B 7/32* (2006.01)
*C04B 7/345* (2006.01)
*C04B 28/02* (2006.01)
*C04B 28/06* (2006.01)

(52) U.S. Cl.
USPC ............ 106/768; 106/739; 106/766; 106/815

(58) Field of Classification Search
USPC .................. 106/739, 766, 768, 815
See application file for complete search history.

(56) References Cited

U.S. PATENT DOCUMENTS

| 6,602,343 | B1  |   | 8/2003 | Costa et al. |         |
|-----------|-----|---|--------|--------------|---------|
| 7,527,688 | B2  |   | 5/2009 | Bingamon et al. |      |
| 8,177,903 | B2  | * | 5/2012 | Walenta et al. | 106/695 |
| 8,268,071 | B2  | * | 9/2012 | Pasquier et al. | 106/693 |

FOREIGN PATENT DOCUMENTS

| FR | 2940274 A1 |   | 6/2010 |
|----|------------|---|--------|
| FR | 2940275 A1 |   | 6/2010 |
| FR | 2941448 A1 | * | 7/2010 |
| FR | 2941449 A1 |   | 7/2010 |
| FR | 2941450 A1 |   | 7/2010 |
| WO | WO2010/070215 A1 | * | 6/2010 |

* cited by examiner

*Primary Examiner* — Anthony J Green
(74) *Attorney, Agent, or Firm* — Porzio, Bromberg & Newman, P.C.

(57) ABSTRACT

The present invention relates to a novel iron-doped sulphoaluminate-belite clinker, a process for preparing this clinker, and also the use of the clinker for the preparation of hydraulic binder and, consequently, of grout, concrete or mortar.

17 Claims, 1 Drawing Sheet

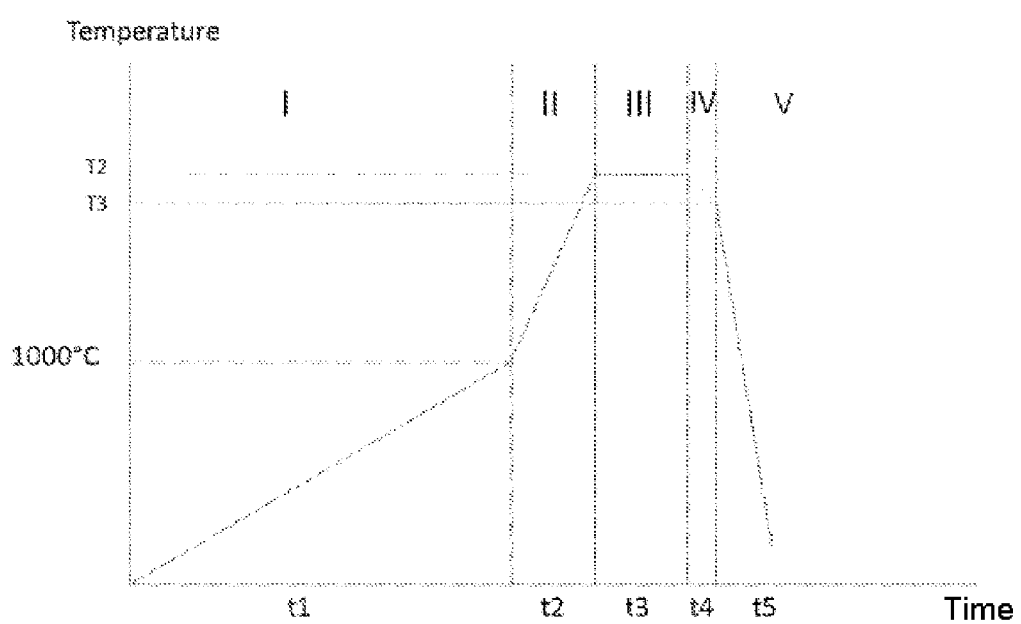

IRON-DOPED SULFO-BELITIC CLINKER

CROSS REFERENCE TO RELATED APPLICATION

This is a National Stage of International Application No. PCT/FR2011/051744, filed 20 Jul. 2011, which claims the benefit of Application No. 10/55926, filed in France on 21 Jul. 2010, the disclosures of which Applications are incorporated by reference herein.

The present invention relates to a novel iron-doped sulfo-belitic clinker, a process for the preparation of this clinker and the use of the clinker in the preparation of hydraulic binder and subsequently of grout, concrete or mortar.

The manufacture of hydraulic binders and in particular that of cements consists essentially of a calcination of a mixture of carefully chosen and apportioned starting materials, also denoted by the term of "raw mix". The burning of this raw mix gives an intermediate product, the clinker, which, ground with optional supplementary cementing materials, will give cement. The type of cement manufactured depends on the nature and proportions of the starting materials and on the burning process. Several types of cements are distinguished: Portland cements (which represent the vast majority of the cements produced in the world), high alumina (or calcium aluminate) cements, natural quick-setting cements, sulfoaluminate cements, sulfo-belitic cements and other intermediate varieties. As these families are not completely unconnected, it is preferable to describe them by their chemical and mineralogical constituents.

The most widely used cements are Portland cements. Portland cements are obtained from Portland clinker, obtained after clinkering a raw mix rich in calcium carbonate in a kiln at a temperature of the order of 1450° C.

The preparation of such cements exhibits the disadvantage of releasing a great deal of $CO_2$. The cement industry is thus today searching for a viable alternative to Portland cement, that is to say cements exhibiting at least the same strength and quality characteristics as Portland cements but which, during their production, would release less $CO_2$.

Research studies have therefore, in recent years, been directed at sulfoaluminate and sulfo-belitic cements which release less $CO_2$ than Portland cements during their production.

As clinker is the result of a high-temperature calcination, the elements are essentially present in the form of oxides. The clinkers which make possible the preparation of sulfoaluminate cements or sulfo-belitic cements relate to a process for the manufacture of a clinker from a raw mix composed of a mixture comprising the compounds $CaCO_3$, $Al_2O_3$ and/or $Al(OH)_3$, $CaSO_4$, $SiO_2$, $Fe_2O_3$ and/or a product containing silica or silicates, such as clay, all these compounds being present in anhydrous or hydrated form, individually or in combination. The raw mix may be prepared with any natural or synthetic mineral materials capable of providing calcium, silicon, sulfur, iron and aluminum.

Many sulfoaluminate clinkers have been described in the context of these research studies. Mention may be made, for example, of the international patent application WO-A-2006/018569, which describes sulfoaluminate-belite clinkers comprising from 5% to 25% of calcium alumino-ferrite phase having a composition corresponding to the general formula $C_2AF_{(1-x)}$, with x between 0.2 and 0.8, from 15% to 35% of "ye'elimite" calcium sulfo-aluminate ($C_4A_3\$$) phase, from 40% to 75% of belite ($C_2S$) and from 0.01% to 10% of one or more minor phases. As mentioned in this patent application, such clinkers contain, in comparison with the alite ($C_3S$) phase, the main component of Portland cements, a greater amount of belite ($C_2S$) phase, which is entirely beneficial since this results in a reduction in industrial emissions of $CO_2$ and in energy consumption. Moreover, the belite contributes to the development of the long-term strength of the sulfoaluminate-belite cement. However, most of the clinkers described in this patent application contain boron, which has a significant economic disadvantage in view of the price and rarity of this constituent.

Moreover, the clinkers described in the international patent application WO-A-2006/018569 did not mention the presence of an iron-doped calcium sulfoaluminate phase that would enable an improvement in the setting and the mechanical compressive strength in the short, medium and long term of the cement prepared from the clinker.

To date, the problems of the materials adhering to the walls of the kiln when the raw mixes are burned, mainly due to the presence of iron in the raw mixes used for the preparation, have prevented the development of iron-rich sulfoaluminate clinkers.

The use of alkanolamines such as, for example, diethanolamine and triethanolamine as accelerators in order to shorten the setting time and increase the mechanical compressive strengths measured after one day is perfectly well known for concretes containing Portland cement. International patent application WO-A-2009/118652 describes the addition of alkanolamine compounds to the sulfoaluminate-belite clinkers described in international patent application WO-A-2006/018569 in order to improve the mechanical compressive properties in the long term (more than 30 days), preferably over more than 60 days, and more preferably over more than 90 days, of the cement prepared from the clinker. However, in this case the use of alkanolamine only artificially improves the low intrinsic performances of a given clinker, whereas a suitable mineralogy of the clinker obtained from a judicious choice of the nature and proportion of the starting materials used for the burning makes it possible to obtain satisfactory mechanical properties without resorting to such an organic additive.

There is therefore a need to find novel clinkers that can be prepared at temperatures considerably below 1425° C., thus greatly reducing the emissions of $CO_2$ during their preparation compared to "Portland" clinkers, while maintaining or even improving the mechanical properties of the cements and concretes prepared from these clinkers compared to those prepared from a Portland clinker.

It has now been found, quite surprisingly, that the iron doping of certain sulfo-belitic clinkers prepared under specific burning conditions made it possible to solve these various problems, without for all that adhesion phenomena being observed during the burning of the raw mixes. Furthermore, these clinkers do not require the presence of boron nor the addition of additives in order to improve the quality of the cements and concretes prepared.

Indeed it has been observed, quite surprisingly, that such clinkers prepared according to the process of the invention enabled the preparation of cements having increased hydraulic reactivity and increased strength compared to cements prepared from the clinkers described in international patent application WO 2006/018569, while making it possible to reduce the emissions of $CO_2$ by close to 35% during their preparation compared to Portland-type clinkers.

One subject of the present invention is therefore firstly a sulfo-belitic clinker comprising, as phase composition, relative to the total weight of the clinker:

from 5% to 60% of iron-doped calcium sulfo-aluminate phase corresponding to the formula $C_4A_xF_y\$_z$ with x varying from 2 to 3,
y varying from 0 to 0.5 and y being other than 0,
and z varying from 0.8 to 1.2;
from 0 to 25% of calcium aluminoferrite phase having a composition corresponding to the general formula $C_6A_{x'}F_{y'}$, with x' varying from 0 to 1.5 and y' varying from 0.5 to 3; and
from 20% to 70% of $C_2S$ belite phase;
less than 10% of $C_{11}S_4B$ phase.

The clinker according to the present invention enables the preparation of cements having an increased hydraulic reactivity and an increased strength in comparison with the cements described in the prior art and Portland cements. Furthermore, the clinker according to the present invention can be prepared at temperatures not exceeding 1350° C., which limits, on the one hand, the emissions of $CO_2$ and, on the other hand, the destruction of the iron-doped calcium sulfo-aluminate phase. Finally, the clinkers according to the invention can be prepared from raw mixes having a high iron content without, however, observing an increase in the adhesion phenomena. This feature of the clinkers according to the present invention enables the use of a wider range of materials for preparing them, such as for example iron-rich bauxite.

In the context of the present invention, the following notations are adopted to denote the mineralogical components of the cement:
C represents CaO;
A represents $Al_2O_3$;
F represents $Fe_2O_3$;
S represents $SiO_2$; and
$ represents $SO_3$.

Thus, for example, the calcium aluminoferrite phase of a composition corresponding to the general formula $C_6A_{x'}F_{y'}$ corresponds in reality to a $(CaO)_6.(Al_2O_3)_{x'}.(Fe_2O_3)_{y'}$ phase.

Furthermore, in the context of the present invention, the proportions expressed in % correspond to percentages by weight with respect to the total weight of the entity (clinker or hydraulic binder) under consideration.

Preferably, one subject of the present invention is a sulfo-belitic clinker in which the following features are selected, alone or in combination:
the clinker contains from 10% to 50% of $C_4A_xF_y\$_z$, iron-doped calcium sulfoaluminate phase;
x varies from 2.1 to 2.9, preferably from 2.2 to 2.8;
y varies from 0.05 to 0.5, preferably from 0.1 to 0.5;
the calcium sulfoaluminate phase contains alumina, iron and sulfur with x varying from 2.1 to 2.9, preferably from 2.2 to 2.8, y varying from 0.05 to 0.5, preferably from 0.1 to 0.5, and z varying from 0.8 to 1.2;
the clinker contains from 0 to 20% of $C_6A_{x'}F_{y'}$ calcium aluminoferrite phase;
x' varies from 0.65 to 1.3;
y' varies from 1.5 to 2.5;
the $C_6A_{x'}F_{y'}$ calcium aluminoferrite phase contains alumina and iron with x' varying from 0.65 to 1.3 and y' varying from 1.5 to 2.5;
the clinker contains from 30% to 55% of $C_2S$ belite phase; and/or
the clinker contains less than 5% of $C_{11}S_4B$ phase, more preferably less than 2% of $C_{11}S_4B$ phase. Quite preferably, the clinker is free of $C_{11}S_4B$ phase.

Preferably, the clinkers according to the invention are completely free of intentionally added boron.

Other minor phases may appear in the composition of the clinker. These minor phases may consist of free lime CaOf, anhydrite C$, gehlenite $C_2AS$, mayenite $C_{12}A_7$, periclase MgO, perovskite CT, $C_3FT$, $C_4FT_2$. Preferably, the clinker according to the invention contains:
less than 3% of CaOf, preferably less than 1% of CaOf;
less than 5% of C$, preferably less than 2% of C$; and/or
less than 10% of $C_2AS$, preferably less than 5% of $C_2AS$.

The clinker according to the present invention must be prepared under precise conditions in order to prevent any adhesion phenomena during the burning. Thus, another subject of the present invention is a process for preparing a clinker as described previously, comprising the following steps:
1) Preparation of a raw mix from the following starting materials:
from 0.1% to 40% of bauxite, marls, red muds or any other sedimentary, metamorphic or magmatic rocks or industrial mineral derivatives having a high aluminum content;
from 0.1% to 12% of gypsum, borogypsum, phosphogypsum, desulfogypsum, anhydrite and/or hemihydrate;
from 0.1% to 65% of limestone and/or of any other sedimentary, metamorphic or magmatic rocks or industrial mineral derivatives having a high calcium content;
from 0 to 12% of quartz, silica, expanded silica, silica fume or any other sedimentary, metamorphic or magmatic rocks or industrial mineral derivatives having a high silicon content; and
from 0 to 12% of iron oxide and/or iron sulfate and/or iron sulfides and/or any natural or synthetic mineral materials rich in iron and/or sulfur;
2) mixing (optionally by intergrinding) of the starting materials,
3) burning of the mixture of the starting materials at a temperature T2 ranging from 1150° C. to 1300° C. according to the following steps:
a) passing from ambient temperature to a temperature ranging from 800° C. to 1200° C. over a time period t1 ranging from 20 to 500 minutes,
b) temperature increase up to the desired final temperature T2, over a time period t2 ranging from 15 to 60 minutes,
c) temperature hold at T2, over a time period t3 ranging from 0 to 60 minutes,
d) temperature decrease from T2 to T3, T3 being greater than or equal to 1100° C., over a time period t4 ranging from 0 to 15 minutes,
e) quenching and rapid cooling of the clinker down to ambient temperature, over a time period t5 ranging from 5 to 60 minutes.

For further clarity, the temperature profile followed in order to carry out the burning of the raw mix according to the process of the invention is illustrated by FIG. 1.

Preferably, the burning step of the process according to the present invention is conducted at a temperature T2 ranging from 1250° C. to 1300° C.

Preferably, the burning step of the process according to the present invention is conducted at a temperature T2, under the following conditions:
a) passing from ambient temperature to 1000° C. over a time period t1 ranging from 90 min to 420 minutes,
b) temperature increase up to the desired final temperature T2, over a time period t2 ranging from 25 to 45 minutes,
c) temperature hold at T2, over a time period t3 ranging from 0 to 30 minutes,
d) temperature decrease from T2 to 1200° C. over a time period t4 ranging from 5 to 10 minutes,
e) quenching and rapid cooling of the clinker down to ambient temperature in 10 minutes.

The clinker according to the present invention may be prepared from various starting materials, such as red muds, bauxite, limestone, marls, gypsum or any other source of calcium sulfate, silica, iron oxides, iron sulfates and iron sulfides, which are natural, or their respective by-products, and any mineral material capable of providing $CaO$, $Al_2O_3$, $Fe_2O_3$, $SiO_2$ and $SO_3$ in suitable amounts or as mixtures.

The quality of the burning, and in particular the observance at every point of an oxidizing atmosphere and of maximum temperatures of 1350° C., is fundamental. The clinkers according to the invention will thus be prepared in a kiln which makes it possible to observe these conditions. Mention may be made, as an example of kilns suitable for preparing the clinkers according to the present invention, of the kiln described in the international patent application published under the number WO-A-2009/122065. The kiln described in this patent application is particularly suitable for the preparation of clinkers according to the invention as it helps to adhere to the temperature profile described above.

The clinker according to the present invention can be used to prepare a hydraulic binder, for example cement, by grinding and optional addition of gypsum, anhydrite or hemihydrate. The present invention thus also relates to a hydraulic binder comprising a clinker as described above in the ground form. Preferably, the hydraulic binder according to the present invention also comprises a supplementary material formed of gypsum, anhydrite or hemi-hydrate, in proportions which can range up to 20%.

The hydraulic binder according to the present invention can also comprise supplementary materials of the same type as those used for Portland cement, such as, for example, limestone, natural and artificial pozzolans, blast furnace slag, fly ash from coal-fired furnaces and silica fumes. This supplementary material is added by mixing before or after the grinding of the constituents, by mixing of the powders or by intergrinding. The setting of the binder is then the result of the activation of the supplementary materials by the clinker. Consequently, the $CO_2$ saving with respect to a cement of CEM I type (according to the standard EN 197-1) can be considerable, ranging up to 90% reduction in the $CO_2$ emissions depending on the content of supplementary material.

Furthermore, in order to improve the mechanical performances of the hydraulic binder, it is possible to add 1% to 5% of finely ground limestone ($CaCO_3$) or "filler". The "filler" can be added by mixing before or after the grinding of the constituents, by mixing of the powders or by intergrinding.

Finally, the present invention also relates to the various products prepared from the binder described above, in particular grouts, concretes and mortars. Thus, another subject of the present invention is a grout, a concrete or a mortar comprising the hydraulic binder as described above.

The present invention can be illustrated without implied limitation by the following examples.

BRIEF DESCRIPTION OF THE DRAWINGS

FIG. 1. is a graph of a temperature profile.

EXAMPLE 1

A raw mix was produced with the starting materials, the chemical analyses of which are listed in the table below.

| Elements | Bauxite | Gypsum | Limestone | Silica | Iron sulfate | Iron oxide |
|---|---|---|---|---|---|---|
| $SiO_2$ (in %) | 6.39 | 0.41 | 0.19 | 98.25 | | |
| $Al_2O_3$ (in %) | 53.36 | 0.21 | 0.06 | 0.32 | | |
| $CaO$ (in %) | 0.76 | 31.51 | 54.65 | 0.12 | | |
| $MgO$ (in %) | 0.04 | 0.02 | 0.74 | 0.09 | | |
| $Fe_2O_3$ (in %) | 9.33 | 0.06 | 0.3 | 0 | 28.74 | 100 |
| $TiO_2$ (in %) | 2.65 | 0.05 | 0.01 | 0 | | |
| $K_2O$ (in %) | 0.01 | 0.04 | 0.04 | 0 | | |
| $Na_2O$ (in %) | 0 | 0.02 | 0 | 0.67 | | |
| $P_2O_5$ (in %) | 0.06 | 0.72 | 0.02 | 0 | | |
| $Mn_2O_3$ (in %) | 0 | 0 | 0.01 | 0 | | |
| $SO_3$ (in %) | 0.18 | 44.64 | 0.06 | 0 | 28.83 | |
| Other non-volatiles (in %) | 0.01 | 1.17 | 0.074 | 0 | | |
| Loss on ignition (in %) | 26.51 | 20.32 | 43.28 | 0.19 | 42.44 | |
| Total | 99.31 | 99.17 | 99.43 | 99.65 | 100 | 100 |

The expression "loss on ignition" is understood to mean the loss of mass observed after burning at 950° C.

Bauxite: Weipa bauxite from Australia.

Gypsum: Industrial by-product resulting from the manufacture of phosphoric acid.

Technical or industrial iron sulfate.

Iron sulfide resulting from mining extraction, of formula $FeS_2$ containing from 44% to 48% of Fe.

An intimate mixture was produced in the following proportions (everything passing through at 100 μm):

| | Bauxite | Gypsum | Limestone | Silica | Iron sulfide | Iron oxide |
|---|---|---|---|---|---|---|
| % | 22.11 | 2.36 | 60.56 | 8.19 | 2.36 | 4.42 |

The estimated chemistries and the chemistries actually obtained of the raw mix and of the clinker are given below.

| Elements | Estimated chemistry of the raw mix | Actual chemistry of the raw mix | Estimated chemistry of the clinker | Actual chemistry of the clinker |
|---|---|---|---|---|
| $SiO_2$ (in %) | 9.59 | 10.05 | 13.84 | 14.16 |
| $Al_2O_3$ (in %) | 11.87 | 12.16 | 17.14 | 17.63 |
| $CaO$ (in %) | 34.02 | 33.87 | 49.12 | 48.63 |
| $MgO$ (in %) | 0.47 | 0.49 | 0.67 | 0.74 |
| $Fe_2O_3$ (in %) | 8.24 | 7.96 | 11.89 | 11.35 |
| $TiO_2$ (in %) | 0.59 | 0.60 | 0.86 | 0.99 |
| $K_2O$ (in %) | 0.03 | 0.03 | 0.04 | 0.06 |
| $Na_2O$ (in %) | 0.06 | 0.06 | 0.08 | 0.03 |
| $P_2O_5$ (in %) | 0.04 | 0.06 | 0.06 | 0.07 |
| $Mn_2O_3$ (in %) | 0.01 | 0.02 | 0.01 | 0.02 |
| $SO_3$ (in %) | 4.28 | 4.55 | 6.17 | 5.64 |
| Other non-volatiles (in %) | 0.07 | 0.06 | 0.11 | 0.08 |
| Loss on ignition (in %) | 30.21 | 29.9 | 0 | 0.59 |
| Total | 99.46 | 99.81 | 100 | 99.99 |

Burning in a continuous kiln such as that described in patent application WO-A-2009/122065 was carried out at 1280° C. for 20 minutes.

The raw mix is introduced into the preheater tower and heated from ambient temperature up to 1050° C. over 410 minutes as it descends in the tower, by the gases rising countercurrent therein.

The material is then admitted into the horizontal section of the continuous kiln via an extractor, and conveyed to the clinkering zone (1280° C.) over a period of 30 minutes and the temperature is held for 20 minutes.

On exiting the clinkering zone, the temperature decreases to 1200° C. over a period of 6 minutes.

Finally, the clinker is sent to the cooler where it undergoes a rapid quenching in order to reach ambient temperature in 10 minutes.

The crystallographic phases obtained are the following:

| Mineralogical composition | % |
|---|---|
| $C_4A_xF_y\$_z$ with x = 2.34, y = 0.27 and z = 1.03 | 40.48 |
| $C_6A_xF_{y'}$ with x' = 1 and y' = 2.09 | 10.68 |
| $C_2S$ α'h | 11.27 |
| $C_2S$ β | 28.98 |
| Other phases | 8.59 |

EXAMPLE 2

By using starting materials identical to those mentioned in example 1, an intimate mixture was produced in the following proportions (everything passing through at 100 μm):

| | Bauxite | Gypsum | Limestone | Silica | Iron sulfate | Iron oxide |
|---|---|---|---|---|---|---|
| % | 21.11 | 5.46 | 56.0 | 7.82 | 5.46 | 4.17 |

The estimated chemistries and the chemistries actually obtained of the raw mix and of the clinker are given below.

| Elements | Estimated chemistry of the raw mix | Actual chemistry of the raw mix | Estimated chemistry of the clinker | Actual chemistry of the clinker |
|---|---|---|---|---|
| $SiO_2$ (in %) | 9.16 | 9.61 | 13.83 | 14.33 |
| $Al_2O_3$ (in %) | 11.33 | 11.52 | 17.12 | 17.1 |
| CaO (in %) | 32.49 | 32.8 | 49.09 | 48.88 |
| MgO (in %) | 0.43 | 0.41 | 0.65 | 0.61 |
| $Fe_2O_3$ (in %) | 7.87 | 7.81 | 11.9 | 11.6 |
| $TiO_2$ (in %) | 0.57 | 0.64 | 0.86 | 0.95 |
| $K_2O$ (in %) | 0.03 | 0.01 | 0.04 | 0.01 |
| $Na_2O$ (in %) | 0.05 | 0.01 | 0.08 | 0.01 |
| $P_2O_5$ (in %) | 0.06 | 0.06 | 0.09 | 0.09 |
| $Mn_2O_3$ (in %) | 0.01 | 0 | 0.01 | 0.02 |
| $SO_3$ (in %) | 4.08 | 4.35 | 6.17 | 5.89 |
| Other non-volatiles (in %) | 0.11 | 0.11 | 0.16 | 0.17 |
| Loss on ignition (in %) | 33.27 | 32.38 | | 0.5 |
| Total | 99.46 | 99.71 | 100 | 100.16 |

Burning in a continuous kiln was carried out according to the conditions of example 1.

The crystallographic phases obtained are the following:

| Mineralogical composition | % |
|---|---|
| $C_4A_xF_y\$_z$ with x = 2.34, y = 0.31 and z = 1.08 | 37.74 |
| $C_6A_xF_{y'}$ with x' = 1.12 and y' = 2.11 | 11.43 |
| $C_2S$ α'h | 14.75 |
| $C_2S$ β | 25.67 |
| Other phases | 10.41 |

EXAMPLE 3

By using starting materials identical to those mentioned in example 1, an intimate mixture was produced in the following proportions (everything passing through at 100 μm):

| | Bauxite | Gypsum | Limestone | Silica | Iron sulfate | Iron oxide |
|---|---|---|---|---|---|---|
| % | 21.62 | 9.21 | 55.3 | 8.01 | 0 | 5.86 |

The estimated chemistries and the chemistries actually obtained of the raw mix and of the clinker are given below.

| Elements | Estimated chemistry of the raw mix | Actual chemistry of the raw mix | Estimated chemistry of the clinker | Actual chemistry of the clinker |
|---|---|---|---|---|
| $SiO_2$ (in %) | 9.39 | 9.65 | 13.83 | 14.05 |
| $Al_2O_3$ (in %) | 11.61 | 11.74 | 17.11 | 17.09 |
| CaO (in %) | 33.3 | 33.42 | 49.06 | 48.48 |
| MgO (in %) | 0.43 | 0.22 | 0.63 | 0.33 |
| $Fe_2O_3$ (in %) | 8.05 | 7.96 | 11.86 | 11.51 |
| $TiO_2$ (in %) | 0.58 | 0.65 | 0.86 | 0.94 |
| $K_2O$ (in %) | 0.03 | 0.01 | 0.04 | 0.06 |
| $Na_2O$ (in %) | 0.06 | 0.02 | 0.08 | 0.03 |
| $P_2O_5$ (in %) | 0.09 | 0.09 | 0.13 | 0.13 |
| $Mn_2O_3$ (in %) | 0.01 | 0 | 0.01 | 0.04 |
| $SO_3$ (in %) | 4.19 | 4.36 | 6.17 | 5.8 |
| Other non-volatiles (in %) | 0.15 | 0.17 | 0.22 | 0.25 |
| Loss on ignition (in %) | 31.55 | 31.34 | | 0.6 |
| Total | 99.43 | 99.63 | 100 | 99.31 |

Burning in a continuous kiln was carried out according to the conditions of example 1.

The crystallographic phases obtained are the following:

| Mineralogical composition | % |
|---|---|
| $C_4A_xF_y\$_z$ with x = 2.41, y = 0.32 and z = 1.08 | 38.84 |
| $C_6A_xF_{y'}$ with x' = 1.2 and y' = 2.19 | 14.32 |
| $C_2S$ α'h | 11.45 |
| $C_2S$ β | 29.58 |
| Other phases | 5.81 |

EXAMPLE 4

By using starting materials identical to those mentioned in example 1, an intimate mixture was produced in the following proportions (everything passing through at 100 μm):

| | Bauxite | Gypsum | Limestone | Silica | Iron sulfide | Iron oxide |
|---|---|---|---|---|---|---|
| % | 26.08 | 6.52 | 56.98 | 9.13 | 1.3 | 0 |

The estimated chemistries and the chemistries actually obtained of the raw mix and of the clinker are given below.

| Elements | Estimated chemistry of the raw mix | Actual chemistry of the raw mix | Estimated chemistry of the clinker | Actual chemistry of the clinker |
|---|---|---|---|---|
| $SiO_2$ (in %) | 10.77 | 11.08 | 15.89 | 16.23 |
| $Al_2O_3$ (in %) | 13.99 | 14.11 | 20.64 | 20.71 |
| CaO (in %) | 33.4 | 33.51 | 49.27 | 49.09 |
| MgO (in %) | 0.44 | 0.44 | 0.65 | 0.64 |
| $Fe_2O_3$ (in %) | 3.47 | 3.44 | 5.12 | 5.05 |
| $TiO_2$ (in %) | 0.7 | 0.78 | 1.03 | 1.13 |
| $K_2O$ (in %) | 0.03 | 0.01 | 0.04 | 0.06 |
| $Na_2O$ (in %) | 0.06 | 0.02 | 0.09 | 0.03 |
| $P_2O_5$ (in %) | 0.07 | 0.07 | 0.11 | 0.1 |
| $Mn_2O_3$ (in %) | 0.01 | 0 | 0.01 | 0 |
| $SO_3$ (in %) | 4.73 | 4.91 | 6.97 | 6.65 |
| Other non-volatiles (in %) | 0.12 | 0.13 | 0.18 | 0.19 |
| | | | | 0.48 |
| Loss on ignition (in %) | 31.61 | 31.56 | | |
| Total | 99.4 | 100.06 | 100 | 100.36 |

Burning in a continuous kiln was carried out according to the conditions of example 1.

The crystallographic phases obtained are the following:

| Mineralogical composition | % |
|---|---|
| $C_4A_xF_y\$_z$ with x = 2.45, y = 0.28 and z = 1.09 | 46.94 |
| $C_6A_xF_y$ | 0 |
| $C_2S$ α'h | 18.31 |
| $C_2S$ β | 25.24 |
| Other phases | 9.51 |

EXAMPLE 5

A raw mix was produced with the starting materials, the chemical analyses of which are listed in the table below.

| Elements | Bauxite | Gypsum | Limestone |
|---|---|---|---|
| $SiO_2$ (in %) | 21.85 | 0.36 | 0.17 |
| $Al_2O_3$ (in %) | 38.24 | 0.25 | 0.07 |
| CaO (in %) | 2.56 | 31.10 | 55.0 |
| MgO (in %) | 0.16 | 0.06 | 0.42 |
| $Fe_2O_3$ (in %) | 20.77 | 0.07 | 0.34 |
| $TiO_2$ (in %) | 1.85 | 0.04 | 0.01 |
| $K_2O$ (in %) | 0.1 | 0.02 | 0.01 |
| $Na_2O$ (in %) | 0.0 | 0.05 | 0.01 |
| $P_2O_5$ (in %) | 0.18 | 0.58 | 0.02 |
| $Mn_2O_3$ (in %) | 0.03 | 0.0 | 0.02 |
| $SO_3$ (in %) | 0.04 | 44.35 | 0.01 |
| Other non-volatiles (in %) | 0.02 | 0.0 | 0.0 |
| Loss on ignition (in %) | 13.66 | 20.41 | 43.47 |
| Total | 99.47 | 99.32 | 99.55 |

Bauxite: Bauxite from Sodicapei France quarry.
Gypsum: Industrial by-product resulting from the manufacture of phosphoric acid.
Iron sulfide resulting from mining extraction, of formula $FeS_2$ containing from 42% to 45% of Fe.

An intimate mixture was produced in the following proportions (everything passing through at 100 μm):

| | Bauxite | Gypsum | Limestone | Iron sulfide |
|---|---|---|---|---|
| % | 37.26 | 9.13 | 52.6 | 1.0 |

The estimated chemistries and the chemistries actually obtained of the raw mix and of the clinker are given below.

| Elements | Estimated chemistry of the raw mix | Actual chemistry of the raw mix | Estimated chemistry of the clinker | Actual chemistry of the clinker |
|---|---|---|---|---|
| $SiO_2$ (in %) | 8.34 | 8.67 | 11.82 | 12.20 |
| $Al_2O_3$ (in %) | 14.31 | 14.7 | 20.29 | 20.54 |
| CaO (in %) | 32.75 | 33.40 | 46.43 | 46.35 |
| MgO (in %) | 0.29 | 0.29 | 0.41 | 0.41 |
| $Fe_2O_3$ (in %) | 8.61 | 8.72 | 12.20 | 11.84 |
| $TiO_2$ (in %) | 0.7 | 0.78 | 0.99 | 1.10 |
| $K_2O$ (in %) | 0.05 | 0.07 | 0.07 | 0.09 |
| $Na_2O$ (in %) | 0.01 | 0.0 | 0.01 | 0.02 |
| $P_2O_5$ (in %) | 0.13 | 0.13 | 0.19 | 0.18 |
| $Mn_2O_3$ (in %) | 0.02 | 0.02 | 0.03 | 0.03 |
| $SO_3$ (in %) | 5.14 | 5.89 | 7.29 | 6.53 |
| Other non-volatiles (in %) | 0.19 | 0.16 | 0.27 | 0.23 |
| Loss on ignition (in %) | 28.96 | 26.92 | 0 | 0.48 |
| Total | 99.5 | 99.93 | 100.0 | 100.01 |

Burning in a continuous kiln such as that described in patent application WO-A-2009/122065 was carried out at 1300° C. for 20 minutes.

The burning conditions are at every point similar to those described in example 1 with the exception of the temperature in the clinkering zone which is 1300° C.

The crystallographic phases obtained are the following:

| Mineralogical composition | % |
|---|---|
| $C_4A_xF_y\$_z$ with x = 2.60, y = 0.25 and z = 1.11 | 42.8 |
| $C_6A_xF_y$ with x = 1 and y = 2.32 | 12.7 |
| $C_2S$ α'h | 6.3 |
| $C_2S$ β | 26.4 |
| Other phases | 11.8 |

EXAMPLE 6

A raw mix was produced with the starting materials, the chemical analyses of which are listed in the table below.

| Elements | Bauxite | Anhydrite | Limestone |
|---|---|---|---|
| $SiO_2$ (in %) | 21.16 | 0.04 | 1.42 |
| $Al_2O_3$ (in %) | 41.18 | 0.14 | 0.35 |
| CaO (in %) | 2.62 | 42.19 | 54.31 |
| MgO (in %) | 0.31 | 0.16 | 0.31 |
| $Fe_2O_3$ (in %) | 18.77 | 0.22 | 0.20 |
| $TiO_2$ (in %) | 2.03 | 0.03 | 0.03 |
| $K_2O$ (in %) | 0.24 | 0.01 | 0.08 |
| $Na_2O$ (in %) | 0.0 | 0.02 | 0.0 |
| $P_2O_5$ (in %) | 0.19 | 0.04 | 0.01 |
| $Mn_2O_3$ (in %) | 0.05 | 0.0 | 0.01 |
| $SO_3$ (in %) | 0.24 | 54.75 | 0.0 |
| Other non-volatiles (in %) | 0.02 | 0.0 | 0.047 |
| Loss on ignition (in %) | 13.42 | 1.99 | 42.76 |
| Total | 100.24 | 99.59 | 99.84 |

The expression "loss on ignition" is understood to mean the loss of mass observed after burning at 950° C.
Bauxite: Bauxite from Sodicapei France quarry.
Anhydrite: Industrial by-product.
Limestone: Limestone from the quarry of the St Egrève plant, France.

An intimate mixture was produced in the following proportions (everything passing through at 100 μm):

|   | Bauxite | Anhydrite | Limestone |
|---|---|---|---|
| % | 37.78 | 9.56 | 52.65 |

The estimated chemistries and the chemistries actually obtained of the raw mix and of the clinker are given below.

| Elements | Estimated chemistry of the raw mix | Actual chemistry of the raw mix | Estimated chemistry of the clinker | Actual chemistry of the clinker |
|---|---|---|---|---|
| $SiO_2$ (in %) | 8.76 | 8.87 | 12.14 | 12.37 |
| $Al_2O_3$ (in %) | 15.79 | 15.45 | 21.87 | 21.38 |
| CaO (in %) | 33.69 | 33.38 | 46.68 | 46.69 |
| MgO (in %) | 0.30 | 0.28 | 0.41 | 0.39 |
| $Fe_2O_3$ (in %) | 7.23 | 7.18 | 10.02 | 10.06 |
| $TiO_2$ (in %) | 0.79 | 0.86 | 1.09 | 1.19 |
| $K_2O$ (in %) | 0.13 | 0.14 | 0.19 | 0.14 |
| $Na_2O$ (in %) | 0.00 | 0.02 | 0.00 | 0.02 |
| $P_2O_5$ (in %) | 0.08 | 0.08 | 0.11 | 0.11 |
| $Mn_2O_3$ (in %) | 0.02 | 0.02 | 0.03 | 0.03 |
| $SO_3$ (in %) | 5.34 | 5.72 | 7.40 | 6.96 |
| Other non-volatiles (in %) | 0.03 | 0.01 | 0.04 | 0.02 |
| Loss on ignition (in %) | 27.83 | 27.65 | 0.0 | 0.33 |
| Total | 100.0 | 99.68 | 100.0 | 99.69 |

Burning in a continuous kiln such as that described in patent application WO-A-2009/122065 was carried out at 1300° C. for 30 minutes.

The burning conditions are at every point similar to those described in example 1 with the exception of the temperature in the clinkering zone which is 1300° C.

The crystallographic phases obtained are the following:

| Mineralogical composition | % |
|---|---|
| $C_4A_xF_y\$_z$ with x = 2.63, y = 0.26 and z = 1.04 | 46.2 |
| $C_6A_xF_y$ with x = 1 and y = 2.22 | 9.8 |
| $C_2S$ α'h | 4.5 |
| $C_2S$ β | 31.3 |
| Other phases | 8.2 |

EXAMPLE 7

The clinkers from examples 1 to 6 were ground with 10% anhydrite so that the oversize at 100 μm is zero. In the case of the clinker from example 5a, a grinding was also carried out with 10% anhydrite and 3% limestone filler.

The cements thus prepared are respectively denoted by cements 1 to 6 in what follows (the cements 1 to 5 being prepared from clinkers 1 to 5 by grinding them with 10% anhydrite, whereas the cement 5a is prepared from the clinker from example 5 interground with 10% anhydrite and 3% limestone filler). Cement 6 is prepared from the clinker from example 6 by intergrinding with 10% anhydrite.

The initial set and the final set are achieved according to the standard EN 196-3 on pure cement paste with the W/C being determined by measuring the consistency using the Vicat apparatus.

From cements 1 to 6, mortars are produced according to the standard EN 196-1, the composition of which is the following:

450 g of cement;
1350 g of standard sand;
225 g of water.

In the case of cement 4, mortars are also produced according to the standard EN 196-1, but the water contents thereof are variable. The composition of these mortars is the following:

450 g of cement;
1350 g of standard sand;
189 g or 202.5 g of water.

The mechanical strength of the mortars is measured on 4×4×16 $cm^3$ prismatic mortar test specimens prepared at 20° C. using metal molds that were demolded at 24 h. The test specimens are then kept in water at 20° C. until the measurement date.

The strength of the samples obtained is tested according to the standard EN 196-1.

The results are presented in the following three tables:

|  | Sample | | | | | | |
|---|---|---|---|---|---|---|---|
|  | Cement 1 | Cement 2 | Cement 3 | Cement 4 | Cement 5 | Cement 5a | Cement 6 |
| Median (μm) | 13.5 | 12.9 | 12.9 | 20.8 | 13.5 | 13.6 | 13.4 |

| | | | Cement 1 | Cement 2 | Cement 3 | Cement 4 | Cement 5 | Cement 5a | Cement 6 |
|---|---|---|---|---|---|---|---|---|---|
| Pure paste setting measurements | W/C | | 0.27 | 0.24 | 0.27 | 0.27 | 0.31 | 0.29 | 0.28 |
| | Initial set (min) | | 30 | 30 | 30 | 50 | 20 | 18 | 10 |
| | Final set (min) | | 130 | 75 | 165 | 95 | 45 | 45 | 21 |

Mortar strength measurements

Compressive strengths (MPa)

| Sample | W/C | 1 day | 2 days | 3 days | 7 days | 28 days | 90 days |
|---|---|---|---|---|---|---|---|
| Cement 1 | 0.5 | / | 21.5 | / | 31.0 | 44.5 | / |
| Cement 2 | 0.5 | / | 25.0 | / | 25.0 | 41.3 | / |
| Cement 3 | 0.5 | / | 27.3 | / | 30.9 | 40.0 | / |
| Cement 4 | 0.5 | / | 33.4 | / | 45.0 | 45.0 | / |
| Cement 4 | 0.45 | / | 41.7 | / | 52.5 | 57.6 | / |
| Cement 4 | 0.42 | / | 44.0 | / | 58.3 | 60.0 | / |
| Cement 5 | 0.5 | 21.4 | / | 38.8 | 41.1 | 42.8 | 45.4 |
| Cement 5a | 0.5 | 23.4 | / | 39.7 | 42.9 | 48.1 | 50.5 |
| Cement 6 | 0.5 | 24.82 | 29.02 | / | 33.66 | 37.5 | / |

Cements 1 to 6 have a rapid increase in strength, and substantial strength at 28 days. The results obtained from cement 4 clearly show that the strengths are even higher as the water/cement ratio decreases.

The results obtained for cements 5 and 5a clearly show the influence of the addition of filler to the long-term strengths.

Generally, the results obtained demonstrate that the performances of the cements prepared from the clinkers of the invention are at least equivalent to those of Portland cements according to the standard EN 197-1 in force.

The invention claimed is:

1. A sulfo-belitic clinker comprising, as phase composition, relative to the total weight of the clinker:
   from 5% to 60% of iron-doped calcium sulfo-aluminate phase corresponding to the formula $C_4A_xF_y\$_z$ with
   x varying from 2 to 3,
   y varying from 0 to 0.5 and y being other than 0,
   and z varying from 0.8 to 1.2;
   from 0 to 25% of calcium aluminoferrite phase having a composition corresponding to the general formula $C_6A_{x'}F_{y'}$, with x' varying from 0 to 1.5 and y' varying from 0.5 to 3; and
   from 20% to 70% of $C_2S$ belite phase;
   less than 10% of $C_{11}S_4B$ phase.

2. The clinker as claimed in claim 1, wherein it contains from 10% to 50% of $C_4A_xF_y\$_z$ iron-doped calcium sulfoaluminate phase.

3. The clinker as claimed in claim 1, wherein x varies from 2.1 to 2.9 and/or y varies from 0.05 to 0.5.

4. The clinker as claimed in claim 1 wherein it contains from 0 to 20% of $C_6A_xF_{y'}$ calcium aluminoferrite phase.

5. The clinker as claimed in claim 1, wherein x' varies from 0.65 to 1.3 and/or y' varies from 1.5 to 2.5.

6. The clinker as claimed in claim 1, wherein it contains from 30% to 55% of $C_2S$ belite phase.

7. The clinker as claimed in claim 1, wherein it contains less than 5% of $C_{11}S_4B$ phase.

8. The clinker as claimed in claim 1, wherein it is completely free of intentionally added boron.

9. The clinker as claimed in claim 1, wherein it contains less than 3% of free lime CaO.

10. The clinker as claimed in claim 1, wherein it contains less than 5% of C$.

11. The clinker as claimed in claim 1, wherein it contains less than 10% of $C_2AS$.

12. A process for preparing a clinker as claimed in claim 1, comprising the following steps:
   1) preparation of a raw mix from the following starting materials:
      from 0.1% to 40% of bauxite, marls, red muds or any other sedimentary, metamorphic or magmatic rocks or industrial mineral derivatives having a aluminum content;
      from 0.1% to 12% of gypsum, borogypsum, phosphogypsum, desulfogypsum, anhydrite or hemihydrate;
      from 0.1% to 65% of limestone or of any other sedimentary, metamorphic or magmatic rocks or industrial mineral derivatives having a calcium content;
      from 0 to 12% of quartz, silica, expanded silica, silica fume or any other sedimentary, metamorphic or magmatic rocks or industrial mineral derivatives having a silicon content; and
      from 0 to 12% of iron oxide and/or iron sulfate and/or iron sulfides and/or any natural or synthetic mineral materials rich in iron and/or sulfur;
   2) mixing of the starting materials,
   3) burning of the mixture of the starting materials at a temperature T2 ranging from 1150° C. to 1300° C. according to the following steps:
      a) passing from ambient temperature to a temperature ranging from 800° C. to 1200° C. over a time period t1 ranging from 20 to 500 minutes,
      b) temperature increase up to final temperature T2, over a time period t2 ranging from 15 to 60 minutes,
      c) temperature hold at T2, over a time period t3 ranging from 0 to 60 minutes,
      d) temperature decrease from T2 to T3, T3 being greater than or equal to 1100° C., over a time period t4 ranging from 0 to 15 minutes,
      e) quenching and rapid cooling of the clinker down to ambient temperature, over a time period t5 ranging from 5 to 60 minutes.

13. The process as claimed in claim 12, wherein the burning of the clinker is carried out at a temperature T2 ranging from 1250° C. to 1300° C.

14. A hydraulic binder comprising a clinker as claimed in claim 1.

15. A grout comprising a hydraulic binder as claimed in claim 14.

16. A concrete comprising a hydraulic binder as claimed in claim 14.

17. A mortar comprising a hydraulic binder as claimed in claim 14.

* * * * *